United States Patent [19]
Lehmann

[11] 3,990,935
[45] Nov. 9, 1976

[54] MACHINE FOR PRODUCING A CORRUGATED SHEET

[75] Inventor: Rolf Lehmann, Mutschellen, AG, Switzerland

[73] Assignee: Escher Wyss Limited, Zurich, Switzerland

[22] Filed: Apr. 18, 1975

[21] Appl. No.: 569,497

[30] Foreign Application Priority Data
Apr. 25, 1974 Switzerland.......................... 5650/74

[52] U.S. Cl............................ 156/472; 29/116 AD
[51] Int. Cl.² ............................................ B31F 1/00
[58] Field of Search............ 156/205, 210, 470–473; 162/296; 425/569, 367, 363; 29/110, 113 R, 113 A, 116 R, 116 AD, 121 R; 100/162 B, 170

[56] References Cited
UNITED STATES PATENTS

| | | | |
|---|---|---|---|
| 2,638,962 | 5/1953 | Nitchie ........................... | 156/205 X |
| 3,347,732 | 10/1967 | Stewart ............................. | 156/497 |
| 3,382,133 | 5/1968 | Healy................................ | 425/367 |
| 3,527,638 | 9/1970 | Sonnichsen ........................ | 156/596 |
| 3,587,152 | 6/1971 | Hold .............................. | 29/116 AD |
| 3,738,896 | 6/1973 | Sonnichsen .................... | 156/470 X |
| 3,885,283 | 5/1975 | Biondetti....................... | 29/116 AD |

FOREIGN PATENTS OR APPLICATIONS

| | | |
|---|---|---|
| 1,467,195 | 12/1965 | France |
| 935,810 | 9/1963 | United Kingdom |
| 1,210,502 | 10/1970 | United Kingdom |

*Primary Examiner*—David A. Simmons
*Attorney, Agent, or Firm*—Pennie & Edmonds

[57] ABSTRACT

Apparatus for making corrugated sheet comprises a pair of meshed flexure compensating grooved rolls and laying-on means for applying a cover sheet to a corrugated web. Hydraulically-operated flexure compensating means are employed, advantageously pistons with hydrostatic lubrication. One of the grooved rolls cooperates with the laying-on means, which may be a pressure roll, a pneumatic hood with a suction chamber, or a traveling belt, and the grooved roll has flexure compensating means acting against the laying-on means. With a pressure roll, flexure compensating means may be employed therein which acts against the cooperating grooved roll. The axis of rotation of the roll shell of one grooved roll may be fixed, and the other grooved roll which cooperates with a pressure roll may have a roll shell disposed for radial or linear translation. The plane of the axes of the cooperating pressure and grooved rolls may be at a substantial angle to the plane through the axes of the pair of grooved rolls, preferably 90°. One or more rolls may be heated by heated hydraulic fluid, or heated air may be used in the pneumatic hood, or heat applied otherwise for setting an adhesive.

14 Claims, 4 Drawing Figures

MACHINE FOR PRODUCING A CORRUGATED SHEET

The present invention pertains to apparatus or a machine for the manufacture of corrugated sheet of the kind used, for example, in pasteboard cartons. The machine includes two grooved rolls through which the sheet passes to have corrugations pressed therein, and means for pressing the rolls together. The machine also includes laying-on means cooperating with one of the grooved rolls for applying at least one cover sheet to the corrugated sheet after the formation of corrugations therein, with means for pressing the laying-on means and grooved roll together.

In apparatus or machines of this kind, in order to produce properly corrugations in the sheet and to avoid tearing thereof, only one tooth of each of the toothed wheels should be permitted to engage between or mesh with two adjacent teeth of the other roll. This requirement imposes a limitation on the diameter of the rolls. In known machines of this kind, therefore, the width of the sheet or web undergoing corrugation is likewise limited. Excessive length for the rolls with a given maximum diameter results in unacceptable deflections of those rolls. Moreover, in known machines there occurs, notwithstanding the relatively narrow width for which they are built, a very non-uniform wear of the rolls which, therefore, have only a short useful life. It is difficult to surmount this shortcoming by giving a camber to the rolls since this means different diameters for the rolls at middle and end portions thereof which, in turn, results in a non-uniform rate of advance of the paper web at various points across its width.

It is an object of the invention to provide a corrugating machine which is not subject to these disadvantages.

The machine of the invention is characterized by the fact that the corrugated or grooved rolls are constructed as flexure compensating rolls, also known as controlled deflection rolls. The grooved rolls each include an axial beam with a roll shell rotatably mounted around it and with at least one hydraulically actuated element between each of the beams and its roll shell, and more particularly with these supporting elements on the two rolls being disposed effectively in a common plane which contains the axes of rotation of the two roll shells, and press the roll shells toward each other.

In this way there can be provided a machine in which the region at which the rolls engage the paper web being corrugated remains exactly or truly straight or rectilinear across the width of the sheet. The invention thus makes it possible to corrugate paper webs or webs of other material at least twice as wide as in previous machines known to the applicant.

Advantageously, moreover, the roll shell of the grooved roll, against which there works the mating roll which cooperates with laying-on means for applying a cover sheet, is supported in radially effective bearings. The radially restrained roll thus provides a fixed reference axis for the mating roll, and optionally for other rolls in the installation.

The grooved roll which cooperates with a pressure roll or other means for laying on the cover sheet may include one or more additional hydraulically actuated supporting elements which exert the stress thereof between the beam of that grooved roll and the roll shell thereof at the circumferential position where the laying-on roll cooperates with it. With this construction, this grooved roll is freed of the forces which would otherwise be imposed on it by the laying-on pressure roll. In this way an exact adjustment of the stresses operating on the grooved rolls against the web will be independent of the laying-on stress. This result is most easily achieved when the hydraulic supporting elements of both of the grooved rolls are fed from a common source of hydraulic pressure.

If the laying-on device takes as usual the form of a smooth surfaced pressure roll, the axis thereof may be disposed in a plane containing also the axis of the grooved roll with which it cooperates, this plane thus containing these two axes and being moreover perpendicular or substantially transverse of the plane defined by the axes of the two grooved rolls. With such a construction, the conditions obtaining at the region of engagement between the grooved rolls and the web will be least subject to effects due to change in the laying-on pressure for the cover sheet, as is desirable. If the laying-on roll is smooth surfaced and solid, this roll can undergo a certain flexure along with the grooved roll with which it cooperates, which flexure is usually tolerable.

As a further feature of the invention, advantageously the grooved roll against which the laying-on roll works has a roll shell which has freedom for translational motion radially of its axis, without fixed radial constraints. This grooved roll is then free of need for radial load carrying bearings, and also free of need for linear guide means between that roll shell and the beam thereof. The result is a particularly simple and advantageous design.

It is also possible to construct the laying-on roll as a flexure compensated roll having one or more hydraulically actuated elements for support of the roll shell from the beam thereof, the roll shell having normally a smooth outside surface. In such a construction, the grooved roll against which the laying-on roll works may be provided with guides permitting translational motion of the roll shell of that grooved roll in the plane defined by the two axes of the grooved rolls. With this construction, flexures of the laying-on roll and of the grooved corrugating roll against which it works are both avoided. This construction is, therefore, especially desirable for the corrugating of wide webs.

The laying-on means may alternatively be pneumatic in nature, taking the form of a hood which is connected to a source of air or other gas under pressure and which presses the cover sheet against the periphery of the grooved corrugating roll. This provides a construction in which the covering and corrugated sheets are pressed together for a longer time than in systems wherein such pressure occurs simply at the nip between a laying-on roll and one of the corrugating rolls. This is advantageous for suitable set of the adhesive by which the cover sheet is to be applied and fastened to the corrugated sheet.

Heating means may be provided in the conduit delivering compressed air to the hood, especially when the adhesive is heat activated or cured.

At the exit end thereof, the gas pressure hood may advantageously be provided with a suction box or other means for providing a less than atmospheric pressure so as to detach from the adjacent grooved roll the newly-formed combination of smooth cover sheet and corrugated sheet. This can also result in economy in heat when the source of pressurized air recovers part of the heated compressed air delivered from the hood.

Alternatively, the laying-on means may be of belt type including one or more belts which pass over guide rollers to embrace part of the periphery of one of the ground corrugating rolls. This arrangement also presses the cover sheet against the corrugated web over an extended area of the cooperating grooved roll.

In all of the embodiments thus far briefly described, the hydraulic fluid employed for support of the roll shell from the fixed beam in flexure compensating rolls may be heated. This medium customarily flows out against the inner surface of the roll shell to effect hydrostatic lubrication of the shell-supporting pistons with respect to the shell, and in this way heat can be delivered to the roll shell for aiding the corrugating and/or adhesive steps involved.

BRIEF DESCRIPTION OF THE DRAWINGS

The invention will now be further described in connection with a number of presently preferred exemplary embodiments and by reference to the accompanying drawings in which.

DESCRIPTION OF THE PREFERRED EMBODIMENTS

Figure 1:
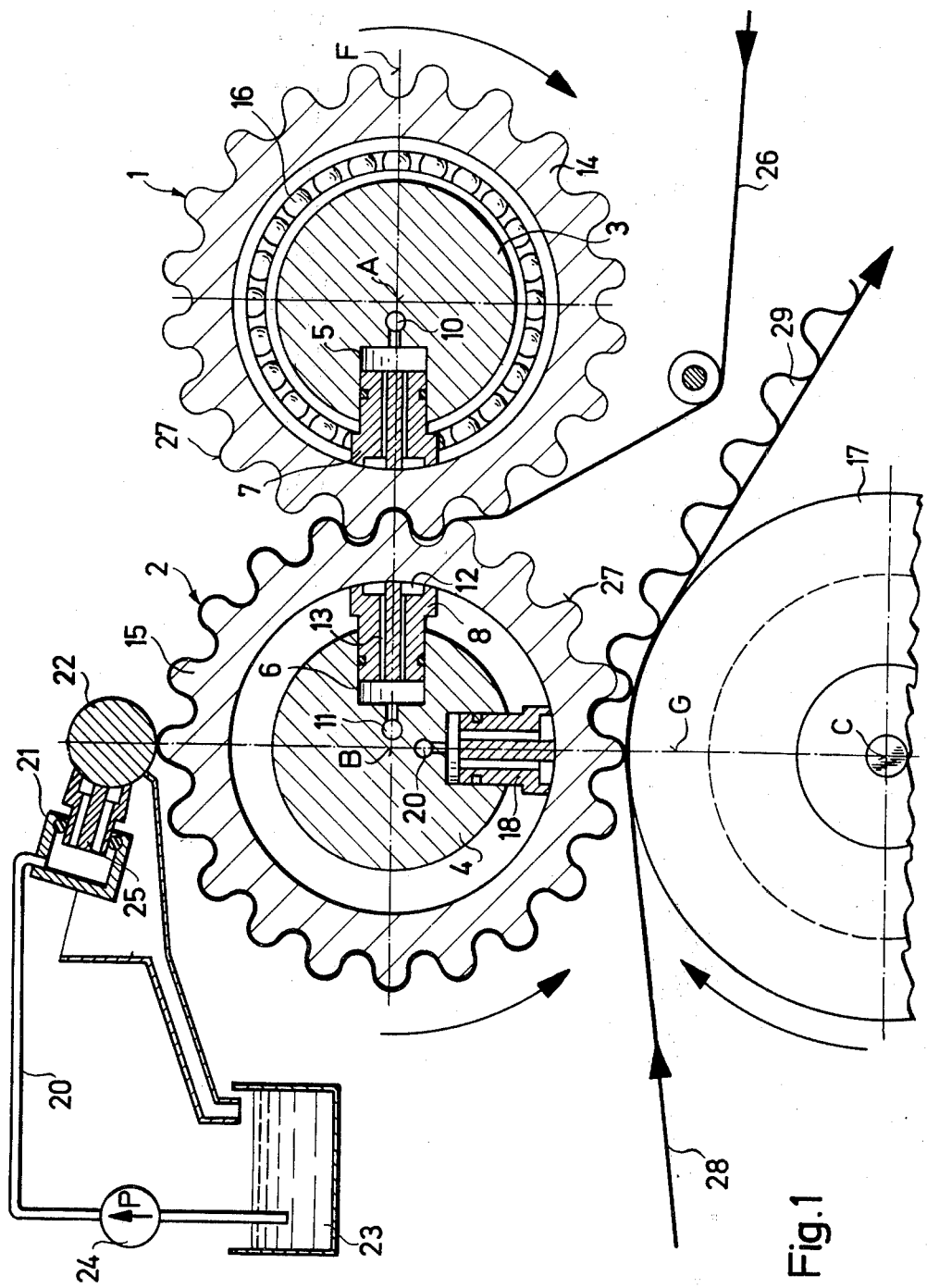
FIG. 1 is a diagrammatic cross-sectional view of one form of machine in accordance with the invention in which the laying-on means is a solid roll.

The machine for the manufacture of corrugated paper diagrammatically shown in FIG. 1 includes a pair of meshed grooved corrugating rolls 1 and 2. These rolls are of the so-called flexure compensating type and include rigid stationary cores or axial beams 3 and 4 encircled by roll shells 14 and 15. Each of the axial beams has formed therein a plurality of cylindrical cavities 5 and 6, spaced axially of the beams, into which there are fitted piston-shaped hydraulic support elements 7 and 8. The cavities 5 and 6 connect to conduits 10 and 11 through which a fluid medium under pressure is supplied.

The pistons 6 and 7 are provided with pockets or recesses 12 at the outer end thereof which connect through capillary bores or similar constructions 13 with the undersides of the pistons so as to provide hydrostatic lubrication between the outer ends of the pistons and the inner surfaces of the roll shells 14 and 15. The roll shell 14 of the roll 1 is rotationally supported at its ends from the core 3 thereof by means of roller bearings 16. In contrast, the roll shell 15 of the roll 2 is supported with freedom for radial movement as a whole and is not constrained either by a set of radially effective bearings such as the bearings 16 of the roll 1 nor by linear guide elements. The roll shell 15 bears against a laying-on roll 17 which, in the embodiment illustrated in FIG. 1, is a full or solid roll supported at its ends by suitable bearings in the frame of the machine. In order to develop a pressure between the grooved roll 2 and the laying-on roll 17, the roll 2 is provided with one or more hydraulically-actuated pistons 18 which are fed from a separate conduit 20 and which in other respects can be similar to the pistons 7 and 8.

The hydraulic support pistons 7, 8 and 18 may take the form either of long bars extending lengthwise of the axis of the beams 3 and 4 or they may be pistons in the ordinary sense, i.e., typically of circular cross-sections. In the latter case, a plurality of the pistons 7, 8 and 18 will be provided, each disposed in a linear array parallel to the axis of the beam in which they are disposed.

Further details with respect to the construction of the pistons 7, 8 and 18 are set forth in U.S. Pat. No. 3,802,044. Other types of rolls can, however, be employed, and hydraulic support elements can be employed with hydrodynamic or wedge film lubrication instead of hydrostatic lubrication. Flexure compensated rolls can also be used in which the roll shell is supported from the beam by means of a fluid maintained under pressure in a sector-shaped space defined between the beam and the shell by means of blades extending outwardly from the beam to the inner surface of the roll shell at circumferentially displaced positions.

As may be seen in FIG. 1, the hydraulic support elements 7 and 8 are operative in a plane identified at F which contains the axes of the rolls 1 and 2. The axis C of the laying-on roll 17 is disposed in a plane G which contains the axis B of the roll 2, the planes G and F being perpendicular to each other.

The machine of FIG. 1 further includes an adhesive applying device which includes a coating or applying roll 22 to which adhesive is supplied by means of a pump 24 and a distributing brush or similar device 25.

In operation a web of paper or the like indicated at 26 is passed between the rollers 1 and 2 where it undergoes corrugation. Adhesive is then applied to the portions of the corrugations which are on the crown of the teeth of the roll 2. The web, now in corrugated form, is then passed through the nip between the laying-on roll 17 and the grooved roll 2 where it is brought together with a cover sheet 28, so that the two are caused to adhere to each other. If the adhesive is one which is activated by heat, the laying-on roll 17 and optionally the roll 2 can be heated. The heating of the roll 2 can be effected by employing heated hydraulic fluid in one or more of the pistons 18.

The finished corrugated sheet comprising the sheet 26 after corrugation, and the cover sheet 28, is indicated at reference character 29 and is withdrawn from the machine by pull off and winding mechanism not shown. It can alternatively be provided with a second cover sheet in a manner known in and of itself.

By giving to the rolls 1 and 2 the construction of flexure compensating rolls, there is achieved the result that the roll shells are not bent during operation so that the region of engagement between them remains straight. Consequently, these rolls may be longer than has been hereto practicable to use. In addition to conferring upon them a longer useful life by reason of the perpendicular relationship of the roll 17 to the rolls 1 and 2, the meshing between the rolls 1 and 2 is practically uninfluenced by the pressure exerted on the roll 2 by the roll 17.

Figure 2:
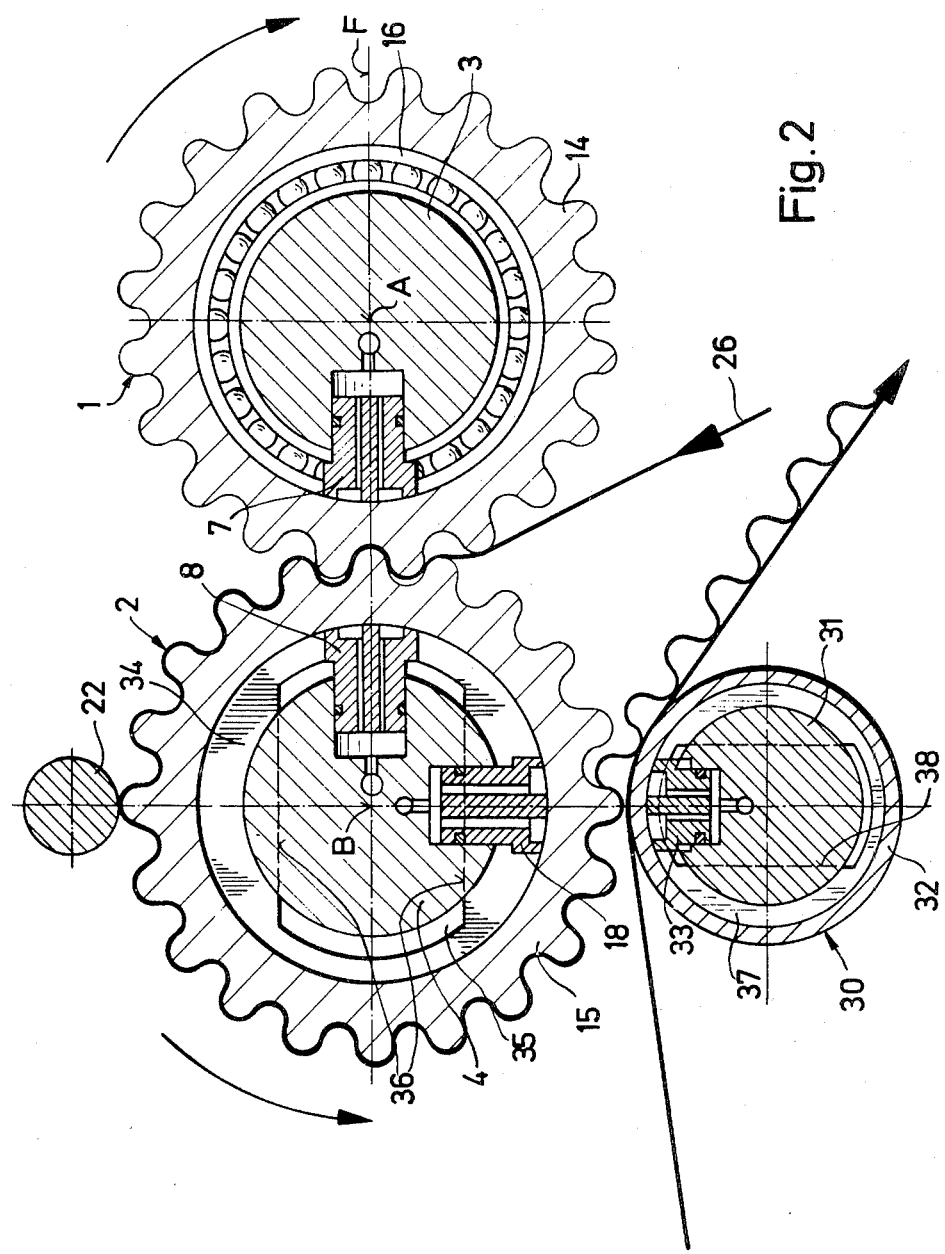
FIG. 2 is a cross-sectional view similar to that of FIG. 1 but showing another embodiment of the invention in which the laying-on roll is itself flexure compensated.

In the embodiment of FIG. 2, where similar elements are structurally identified by the same reference characters as in FIG. 1, the laying-on roll identified at reference character 30 itself takes the form of a flexure compensating roll. It includes a central core 31 with a roll shell 32 rotatably disposed about it. The roll shell is supported on the hydrostatically lubricated piston-type elements 33 which can take the same form as the elements 7, 8 and 18 of FIG. 1. In the embodiment of FIG. 2, the roll shell is supported on annular bearing and guide disks 34, for example at each end thereof. Each of these disks has an opening 35 therethrough bounded in part by parallel plane surfaces 36 which cooperate with parallel flats formed on the beam.

The bearing guide disks 34 thus confer upon the roll shell 15 a degree of freedom according to which the roll shell is capable of executing translational motion toward or away from the mating corrugating roll 1. The roll shell 32 of the laying-on roll 30, in such an arrangement, is provided with bearing disks 37 at each end similar to the disk 34, thereby defining a path of motion for the roll shell 32 which is vertical in FIG. 2 and more particularly perpendicular to the direction of translational motion permitted for the roll shell 15.

The embodiment of FIG. 2 has the advantage that the nip between the laying-on roll 30 and the second corrugating roll 2 is similarly free of deformation due to flexure and remains rectilinear under all conditions of operation since the roll shell 15 of the roll 2 does not bend in the vertical plane of FIG. 2. Also, the engagement between the corrugating rolls 1 and 2 is held to optimum form notwithstanding the presence of the laying-on roll 30.

Figure 3:
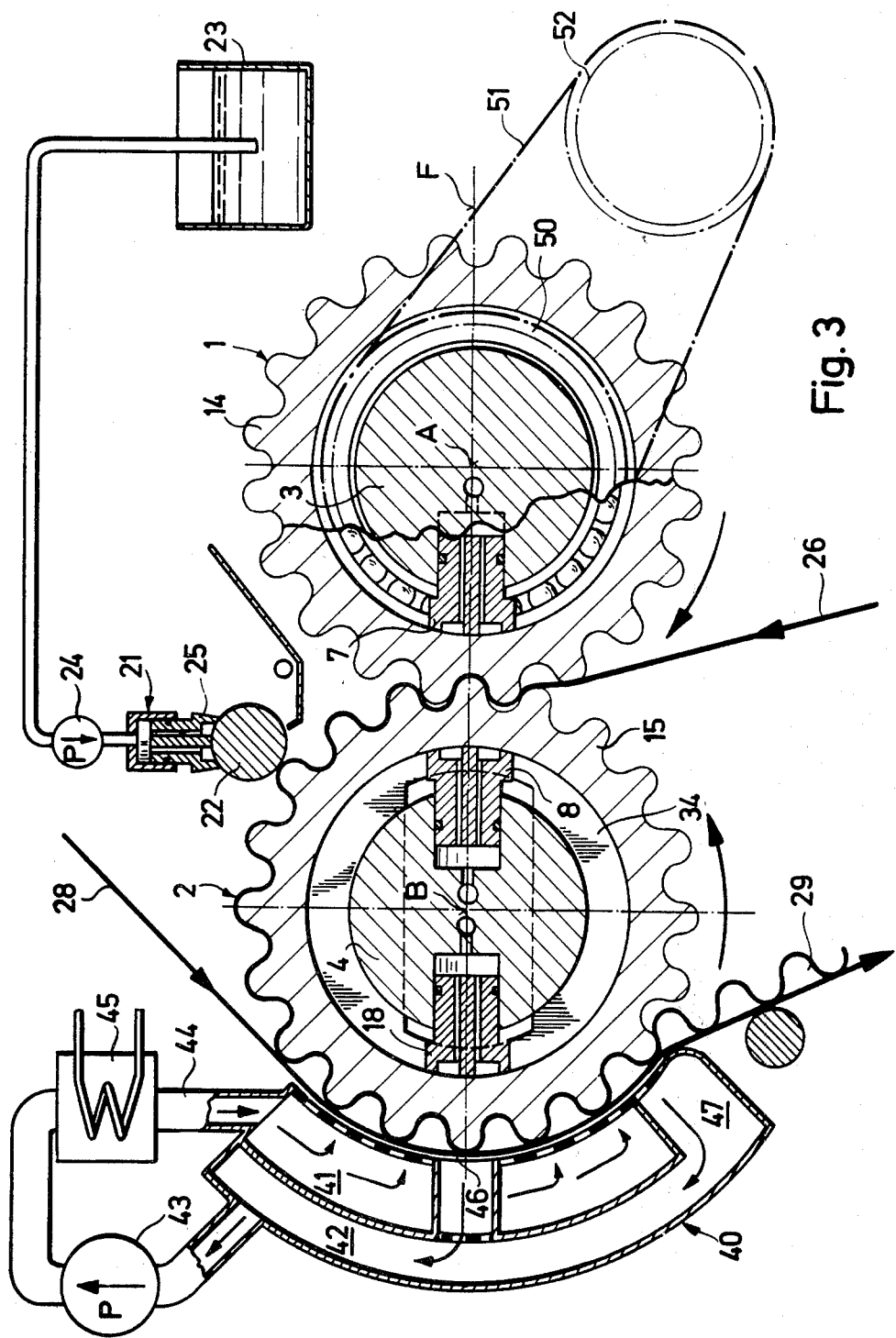
FIG. 3 is a cross-sectional view of another embodiment according to the invention in which the laying-on means takes the form of a hood for the supply of gas under pressure.

The embodiment of FIG. 3 differs from that of FIGS. 1 and 2 in that the laying-on means takes the form of a hood for the application of gas pressure. The hood 40 includes an inlet conduit or manifold 41 and an exhaust or outlet conduit 42. Air withdrawn from the outer conduit 42 by the circulating blower 43 is directed thrugh a conduit 44 passing over a heating device 45 and is thence delivered into the inlet manifold 41. The air passes out of the manifold 41 through openings into a space 46 between the hood 40 and the periphery of the roll shell 15. The air so energing exerts its pressure toward the surface of the roll shell and in doing so it presses the cover sheet 28 against the corrugated sheet 26. By heating the air there is effected an activation of the adhesive.

The blowing hood of FIG. 3 has the advantage that it provides a pressure of the cover sheet 28 against the corrugated sheet over a large surface so that pressure is maintained between the two for a longer time.

As FIG. 3 indicates, the hood 40 is provided with a suction chamber 47 near the exit downstream end thereof with respect to the direction of movement of cover sheet 28. The suction chamber 47 facilitates return of the heated air to the circulating blower 43, and at the same time facilitates separation of the combined cover and corrugated sheets, collectively indicated at 29, away from the grooved roll 2.

In FIG. 3 a drive has been indicated for the grooved roll 1. This drive includes a sprocket wheel 50 over which there passes a chain 51. Drive of the roll is effected by a sprocket wheel 52 driven by a motor (not shown).

Figure 4:
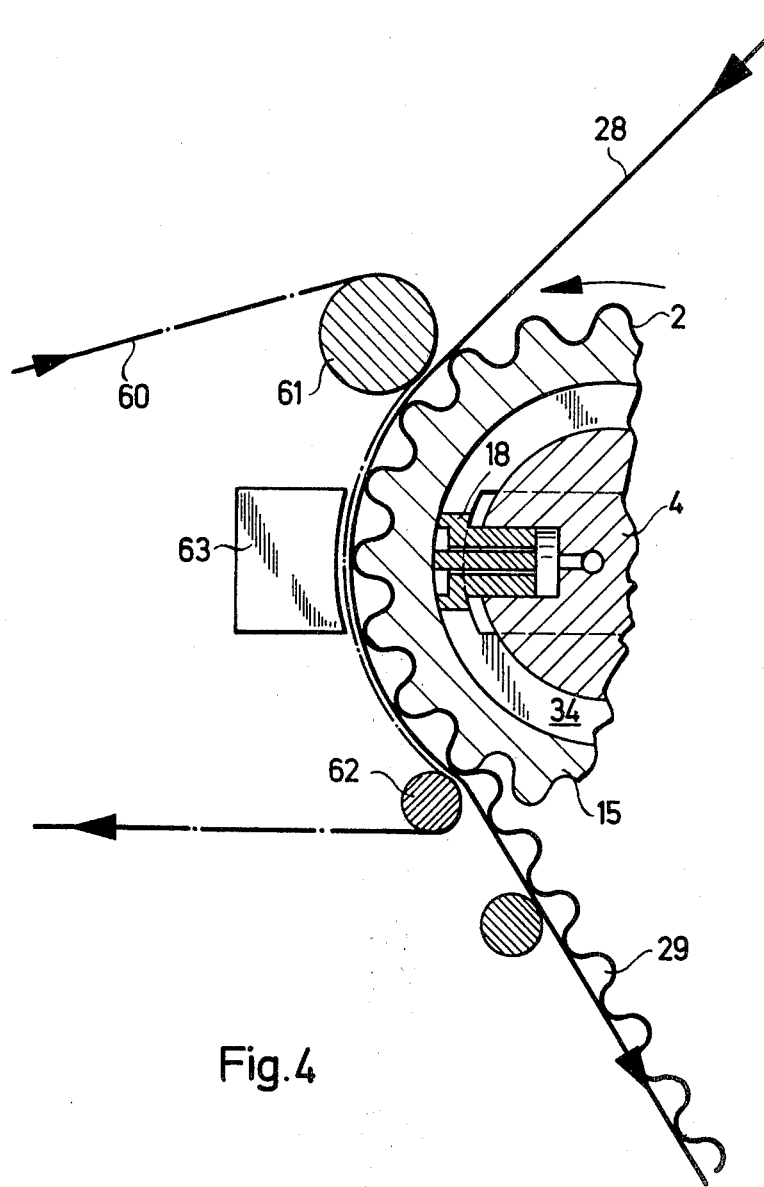
FIG. 4 is a fragmentary view of another embodiment similar to that of FIG. 3 but employing belt mechanisms for application of the cover sheet to the corrugated web.

Lastly, FIG. 4 shows an embodiment of the machine in which, for application of the cover sheet, there is provided a belt 60 which may take the form of a steel band or of a woven wire fabric and which passes over guide rollers 61 and 62. The belt 60 thus embraces a portion of the periphery of the corrugating roll 2 and presses the cover sheet 28 against the corrugated sheet.

For activation of the adhesive a heating device 63 can be provided employing heated air, or other heat-radiating means can be employed for the application of heat to the cover sheet 28.

Although in the embodiments shown in FIGS. 1 and 2 the axes of the laying-on roll and of the cooperating corrugating roll lie in a vertical plane G which is perpendicular to the plane F of the corrugating rolls themselves, it is also possible to dispose the rolls otherwise. Thus for example, the axes A, B and C of the rolls of FIG. 1 may lie in a plane, or the planes G and F may form an obtuse angle.

While the invention has been described hereinabove in terms of a number of presently preferred embodiments thereof, the invention itself is not limited thereto but rather comprehends all modifications of and departures from those embodiments properly falling within the spirit and scope of the appended claims.

I claim:

1. Apparatus for manufacturing corrugated sheet, for example corrugated board, which comprises first and second meshed flexure-compensating grooved rolls for corrugating a web passing therebetween, each of said rolls including an axial beam and a unitary grooved roll shell with hydraulically operated means for exerting stress between the axial beam and the roll shell, said hydraulically operated means being arranged to press said grooved roll shells toward each other in the plane extending through the axes of the rolls, laying-on means cooperating with said second grooved roll for pressing a cover sheet against the corrugated web, and hydraulically operated means in said second grooved roll for exerting stress between the axial beam and roll shell thereof in the direction of said laying-on means.

2. Apparatus according to claim 1 in which each said hydraulically operated means includes at least one hydraulically actuated piston for exerting stress between the axial beam and roll shell.

3. Apparatus according to claim 1 in which the roll shell of said first grooved roll is rotatably mounted at its ends in bearings supported by the axial beam thereof and establishing a fixed axis of rotation of the roll shell.

4. Apparatus according to claim 1 in which said laying-on means comprises a pressure roll rotatable about an axis parallel to the axis of said second grooved roll, the plane through the axes of said pressure and second grooved roll being perpendicular to the plane through the axes of the first and second grooved rolls.

5. Apparatus according to claim 4 in which the roll shell of said second grooved roll is disposed for radial movement as a whole with respect to the axial beam thereof.

6. Apparatus according to claim 5 in which the roll shell of said first grooved roll is rotatably mounted at its ends in bearings supported by the axial beam thereof and establishing a fixed axis of rotation of the roll shell.

7. Apparatus according to claim 1 in which said laying-on means comprises a flexure-compensating pressure roll including an axial beam and a roll shell with hydraulically operated means for exerting stress between the said beam and the roll shell in the direction of said second grooved roll, said second grooved roll including guide means allowing movement of the roll shell thereof in the plane through the axes of the first and second grooved rolls, the plane through the axes of said pressure and second grooved rolls making a substantial angle with respect to the plane through the axes of the first and second grooved rolls.

8. Apparatus according to claim 7 in which said angle between the planes is substantially 90°.

9. Apparatus according to claim 1 in which said laying-on means comprises hood means connected with a source of compressed gas, said hood means extending adjacent a portion of the periphery of said one grooved roll for applying gas pressure to a cover sheet passing therebetween.

10. Apparatus according to claim 9 including heating means for heating the gas which exerts said gas pressure against the cover sheet.

11. Apparatus according to claim 9 in which said hood means includes an inlet section for applying said gas pressure to a cover sheet and an outlet conduit connected to a suction source, said outlet conduit having a suction chamber adjacent the periphery of said one grooved roll at the exit end with respect to the direction of movement of the cover sheet for lifting the combined cover sheet and corrugated web off said one grooved roll.

12. Apparatus according to claim 1 in which said laying-on means comprises a belt and guide means therefor, said belt bearing against a portion of the periphery of said one grooved roll with a cover sheet passing therebetween.

13. Apparatus according to claim 1 in which said hydraulically operated means in each of said grooved rolls includes hydrostatically lubricated piston means, and in which said laying-on means comprises a flexure-compensating pressure roll including an axial beam and a roll shell with hydraulically-operated hydrostatically lubricated piston means for exerting stress between the axial beam and the roll shell thereof in the direction of said one grooved roll.

14. Apparatus according to claim 13 in which the hydraulic fluid of at least second of said rolls is heated.

* * * * *